UNITED STATES PATENT OFFICE.

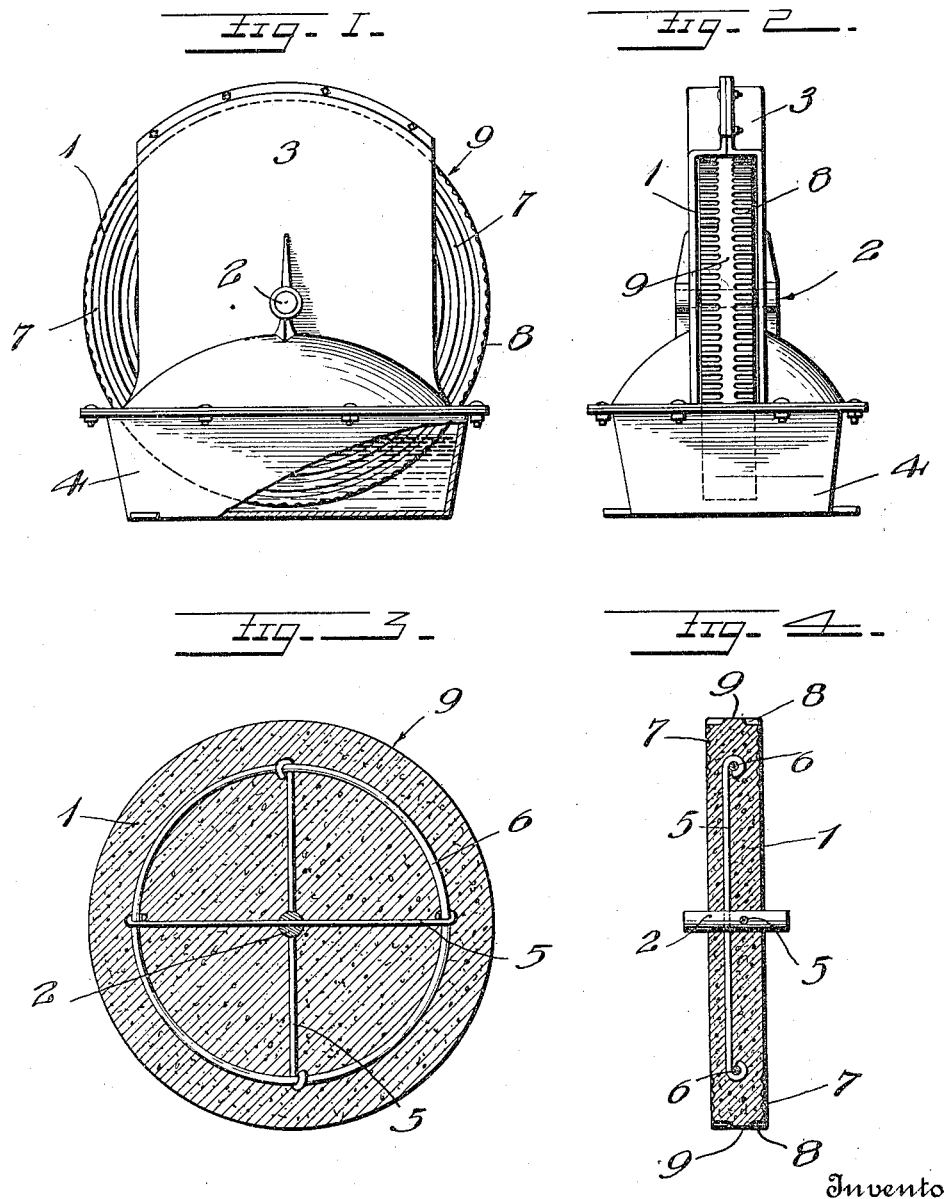

WILLIAM J. MARSH, OF DEXTER, IOWA.

HOG-OILER.

1,289,852.  Specification of Letters Patent.  Patented Dec. 31, 1918.

Application filed August 16, 1917. Serial No. 186,619.

*To all whom it may concern:*

Be it known that I, WILLIAM J. MARSH, a citizen of the United States, residing at Dexter, in the county of Dallas and State of Iowa, have invented certain new and useful Improvements in Hog-Oilers; and I do declare the following to be a full, clear, and exact description of the invention, such as will enable others skilled in the art to which it appertains to make and use the same.

My invention has for its object to improve upon the type of rubbing wheel shown in my U. S. Patent No. 1,225,456 of May 8, 1917, the improvements consisting in providing corrugations on the sides and periphery of the wheel, in a novel manner.

With the foregoing general object in view, the invention resides in the novel features of construction and unique combinations of parts to be hereinafter fully described and claimed, the descriptive matter being supplemented by the accompanying drawing, which forms a part of this specification and in which:—

Figure 1 is a side elevation of a hog oiling device showing the application of the improved type of rubbing wheel;

Fig. 2 is an edge elevation of Fig. 1;

Fig. 3 is a vertical section of the rubbing wheel cut centrally between the two flat sides thereof; and, Fig. 4 is a transverse section of the wheel.

In the drawings above briefly described, the numeral 1 designates the improved rubbing wheel, said wheel being cast from cement and having an axle 2 by which it is rotatably supported in a suitable housing 3 which rises from an oil pan 4. The lower edge portion of the wheel 1 extends into the pan 4 to receive oil therefrom so that when the hogs rub against the exposed edge portions of the device, the oil collected by the rotating wheel, will be distributed upon their bodies.

A plurality of diametrically disposed reinforcing wires 5 are embedded in the wheel 1 and pass through radial openings in the shaft or axle 2, the ends of said wires being twisted around or otherwise secured to a reinforcing ring 6 which is likewise embedded in the cement of which the wheel is constructed. By this arrangement, it will be obvious that the wheel is effectively reinforced, and at the same time torsional and other movement of the axle in respect to the wheel, will be prevented.

In molding the wheel 1, the flat sides thereof are formed with circumferentially extending concentric corrugations 7, whereas the periphery of the wheel is formed with transverse corrugations 8, all of the corrugations being rounded to prevent any possibility of injuring the hog's body. It will be observed that the corrugations 8 are of less length than half of the thickness of the wheel 1, and that these corrugations extend from the edges of said wheel toward the center thereof, thus leaving a circumferential void 9 between the two sets of corrugations. This void 9 and the ribs formed by the corrugations on opposite sides thereof, coöperate in producing a highly efficient rubbing surface, the corrugations serving to wrinkle the animal's skin so that the pores thereof are effectively opened and cleaned of any foreign matter to permit the oil to readily permeate. After wrinkling by one of the series of corrugations 8, the skin is again straightened out by the void 9, and after this operation, the other series of corrugations duplicate the action of the first series, it being understood that all of this takes place as the animal rubs to and fro upon the edge of the wheel.

In addition to forming a highly efficient rubbing surface, the corrugations 8 serve to carry the oil upwardly as the wheel is rotated by rubbing against the same, thus insuring that the exposed edges of the wheel shall at all times be so coated with the oil as to cause the device to operate effectively. Any oil running from the ends of the corrugations 8, will be checked in its downward movement by the corrugations 7 which guide the oil around the edge portions of both sides of the wheel, and prevent it from running straight down the sides thereof into the pan 4. It will be obvious, that by holding the oil around the edges of the wheel, the same will be more effective than otherwise.

From the foregoing, taken in connection with the accompanying drawing, it will be obvious that although my invention is of extremely simple and inexpensive construction, it will be highly efficient and durable. For these reasons, the exact arrangement shown and described constitutes the preferred form of the rubbing wheel. I wish it understood, however, that within the scope of the invention as claimed, numerous minor changes may well be made. Furthermore, although I have illustrated a convenient mounting for the wheel 1, it is to be understood that any other suitable means could well be employed for holding it in an operative position.

I claim:

1. A hog oiler comprising an oil pan, a disk-like rubbing wheel disposed in a vertical plane and dipping into said pan, the flat sides of said wheel having concentric rounded corrugations near their peripheries to cause the downwardly flowing oil thereon to travel around the edge of the wheel, said corrugations also providing rubbing surfaces.

2. A hog oiler comprising a disk-like rubbing wheel disposed in a vertical plane, an oil pan into which said wheel dips, and transverse rounded corrugations on the edge of the wheel of less length than half the thickness of said wheel and extending from the corners of the wheel toward the center thereof.

3. A hog oiler comprising an oil pan, a disk-like hog rubbing wheel disposed in a vertical plane and dipping into said pan, and means on the flat sides of the wheel for causing any gravitating oil thereon to travel around the peripheral portions of said sides instead of vertically down the same.

In testimony whereof I have hereunto set my hand in the presence of two subscribing witnesses.

WILLIAM J. MARSH.

Witnesses:
E. E. ILGENFRITZ,
J. H. TODD.

Copies of this patent may be obtained for five cents each, by addressing the "Commissioner of Patents, Washington, D. C."